United States Patent
Galiano et al.

(10) Patent No.: US 10,134,531 B2
(45) Date of Patent: Nov. 20, 2018

(54) COMPOSITION COMPRISING A SPECIFIC IONIC LIQUID

(71) Applicants: COMMISSARIAT A L'ENERGIE ATOMIQUE ET AUX ENERGIES ALTERNATIVES, Paris (FR); UNIVERSITE FRANCOIS RABELAIS, Tours (FR)

(72) Inventors: Herve Galiano, La Ville aux Dames (FR); Meriem Anouti, Saint Avertin (FR); Laure Timperman, Tours (FR)

(73) Assignees: COMMISSARIAT A L'ENERGIE ATOMIQUE ER AUX ENERGIES ALTERNATIVES, Paris (FR); UNIVERSITE FRANCOIS RABELAIS, Tours (FR)

( * ) Notice: Subject to any disclaimer, the term of this patent is extended or adjusted under 35 U.S.C. 154(b) by 26 days.

(21) Appl. No.: 14/407,563

(22) PCT Filed: Jun. 20, 2013

(86) PCT No.: PCT/EP2013/062880
§ 371 (c)(1),
(2) Date: Dec. 12, 2014

(87) PCT Pub. No.: WO2013/190039
PCT Pub. Date: Dec. 27, 2013

(65) Prior Publication Data
US 2015/0187514 A1 Jul. 2, 2015

(30) Foreign Application Priority Data

Jun. 22, 2012 (FR) ..................................... 12 55918

(51) Int. Cl.
*H01G 11/26* (2013.01)
*H01G 11/60* (2013.01)
(Continued)

(52) U.S. Cl.
CPC ............. *H01G 11/26* (2013.01); *H01G 11/52* (2013.01); *H01G 11/60* (2013.01); *H01G 11/62* (2013.01);
(Continued)

(58) Field of Classification Search
CPC ........ H01G 11/26; H01G 11/52; H01G 9/012; H01G 9/016; H01G 9/022; H01M 10/0565
See application file for complete search history.

(56) References Cited

U.S. PATENT DOCUMENTS

2007/0215007 A1* 9/2007 Mehltretter ......... C09B 67/0014
106/493
2011/0070504 A1* 3/2011 Matsumoto ....... H01M 10/0525
429/325

(Continued)

FOREIGN PATENT DOCUMENTS

| FR | 2978765 A1 | 2/2013 |
|----|------------|--------|
| WO | 2004082059 A1 | 9/2004 |
| WO | 2011029006 A2 | 3/2011 |

OTHER PUBLICATIONS

Anouti, M., et al, "Synthesis and characterization of new pyrrolidinium based protic ionic liquids. Good and superionic liquids.", "J. Phys. Chem. B.", Oct. 1, 2008, pp. 13335-13343, vol. 112.
(Continued)

*Primary Examiner* — Nguyen Ha
(74) *Attorney, Agent, or Firm* — Pearne & Gordon LLP

(57) ABSTRACT

The invention relates to a composition comprising an ionic liquid consisting in the combination of a pyrrolidinium cation and a nitrate anion and comprising a solvent selected from lactone solvents, carbonate solvents, nitrile solvents
(Continued)

and mixtures thereof. The composition may be used as an electrolyte, for example, for such applications as energy storage devices.

12 Claims, 3 Drawing Sheets

(51) Int. Cl.
  *H01G 11/62* (2013.01)
  *H01G 11/52* (2013.01)
  *H01G 11/58* (2013.01)
  *H01M 10/052* (2010.01)
  *H01M 10/0568* (2010.01)
  *H01M 10/0569* (2010.01)

(52) U.S. Cl.
  CPC .......... *H01G 11/58* (2013.01); *H01M 10/052* (2013.01); *H01M 10/0568* (2013.01); *H01M 10/0569* (2013.01); *H01M 2300/0045* (2013.01); *Y02E 60/13* (2013.01)

(56) References Cited

U.S. PATENT DOCUMENTS

| | | | |
|---|---|---|---|
| 2011/0311884 A1* | 12/2011 | Armand | B22F 9/24 429/336 |
| 2012/0318360 A1* | 12/2012 | Kawata | C07D 233/58 136/263 |
| 2013/0224576 A1* | 8/2013 | Rosciano | C07D 295/088 429/199 |
| 2014/0168855 A1 | 6/2014 | Galiano et al. | |
| 2014/0175326 A1* | 6/2014 | Galiano | H01G 11/58 252/62.2 |

OTHER PUBLICATIONS

Anouti, M., et al, "Protic ionic liquid as electrolyte for high-densities electrochemical double layer capacitors with activated carbon electrode material", "Electrochimica Acta", Mar. 2012, pp. 110-117, vol. 64.

Anouti, M., et al, "A pyrrolidinium nitrate protic ionic liquid-based electrolyte for very low-temperature electrical double-layer capacitors", "Physical Chemistry Chemical Physics", May 7, 2013, pp. 6539-6548, vol. 15.

Jiang, H., et al., "Volumetric and surface properties of pure ionic liquid n-octyl-pyridinium nitrate and its binary mixture with alcohol", "The Journal of Chemical Thermodynamics", Apr. 2012, pp. 203-308, vol. 47.

Mysyk, R., et al., "Pseudo-capacitance of nanoporous carbons in pyrrolidinium-based protic ionic liquids", "Electrochemistry Communications", Mar. 2010, pp. 414-147, vol. 12, No. 3.

Pires, J., et al., "Density, conductivity, viscosity, and excess properties of (pyrrolidinium nitrate-based Protic Ionic Liquid + propylene carbonate) binary mixture", "The Journal of Chemical Thermodynamics", Apr. 2013, pp. 10-19, vol. 59.

* cited by examiner

US 10,134,531 B2

COMPOSITION COMPRISING A SPECIFIC IONIC LIQUID

CROSS-REFERENCE TO RELATED APPLICATIONS

This application is a U.S. national phase under the provisions of 35 U.S.C. § 371 of International Patent Application No. PCT/EP13/62880 filed Jun. 20, 2013, which in turn claims priority of French Patent Application No. 1255918 filed Jun. 22, 2012. The disclosures of such international patent application and French priority patent application are hereby incorporated herein by reference in their respective entireties, for all purposes.

TECHNICAL FIELD

The present invention relates to novel compositions resulting from the original association between a specific ionic liquid, itself being a combination between a specific cation and a specific anion, and a specific organic solvent type.

These compositions have excellent properties in terms of conductivity, viscosity, thermal stability (notably for a wide range of temperatures, for example between −60° C. and +150° C.)

Therefore it is quite natural that these compositions may find application as electrolytes in energy storage devices such as supercapacitors.

STATE OF THE PRIOR ART

There exist three large types of energy storage devices allowing reversible storage of electric energy: conventional dielectric capacitors, accumulators or secondary electrochemical generators and supercapacitors.

Supercapacitors are of a quite particular interest both for the field of on-board energy and that of portable energy.

From an operating point of view, supercapacitors operate on the principle of the double electrochemical layer whence the designation in English sometimes encountered of "Electrochemical Double Layer Capacitor" (also known under the acronym of EDLC), i.e., in other words on the principle of energy storage by distributing the ions from an electrolyte in the vicinity of the surface of two porous electrodes impregnated with electrolyte, separated by an insulating and porous membrane ensuring ion conduction.

Thus, a basic cell of a supercapacitor may amount to the following elements:
 a positive electrode;
 a positive electrode/electrolyte interface forming a double electric layer;
 an insulating and porous membrane impregnated with said electrolyte;
 a negative electrode; and
 a negative electrode/electrolyte interface forming a double electric layer.

Because of the existence of these two interfaces each forming a double electrochemical layer, a supercapacitor may be considered schematically as the series association of two capacitors, one with a positive electrode and the other with a negative electrode, both of these capacitors being generated by applying a current to the terminals of the supercapacitor, which generates an area of charges at both electrode-electrolyte interfaces, the energy being thus stored electrostatically and not electrochemically.

There exist three large types of supercapacitors:
 supercapacitors based on carbon, which conventionally associate two electrodes based on activated carbon, also known under the name of "supercapacitors with a double electrochemical layer" and are also very often described as symmetrical systems, because the positive and negative electrodes are identical;
 supercapacitors based on metal oxides, operating on the principle of energy storage via a protonation reaction at the surface of electrodes based on oxide(s) of noble metals (for example, $RuO_2$ and $IrO_2$), this type of supercapacitors remaining dedicated to markets with high added value, because of the costs induced by the use of noble metals;
 supercapacitors, which associate a battery electrode with a supercapacitor electrode, which earns these supercapacitors the name of "hybrid systems" or further the name of "asymmetrical hybrid systems", because they comprise two different electrodes.

It is known that the stored energy and the power delivered by a supercapacitor depend on the square of the applicable rated voltage, which means, in other terms, that the performances of a supercapacitor may be greatly improved by acting on the increase in the rated voltage applicable to the terminals of the supercapacitor.

Thus, the maximum potential difference on the terminals of the supercapacitor is conditioned by the nature of the electrolyte and on its aptitude of remaining stable in a given electrochemical window. Inter alia, it also proved to be necessary that an electrolyte while being stable over a wide electrochemical window have the following characteristics:
 good ionic conductivity;
 a high temperature range; and
 a relatively low viscosity so as to allow good mobility of the ions.

Presently, three types of electrolytes are used in supercapacitors:
 aqueous electrolytes, consisting of salt(s) dissolved in water;
 organic electrolytes, consisting in salt(s) dissolved in an organic solvent;
 ionic liquids consisting in a liquid salt at room temperature.

As regards aqueous electrolytes, whether they are acid (for example, a sulfuric acid solution) or basic (for example, a potash solution), the applicable rated voltage range, for reasons of decomposition of water, is limited to about 1 V, which requires, in order to attain conventional voltages (for example, 12V), proceeding with complex arrangements of several supercapacitor units. Further, the accessible temperature range is limited because of the low solubility of certain salts in an aqueous medium, which does not allow the use of these electrolytes at temperatures below −20° C.

As regards organic electrolytes, they have greater electrochemical stability window than aqueous electrolytes. An organic solvent commonly used, for entering the structure of these electrolytes, is acetonitrile. This solvent is not very viscous, dissolves very well with salts and is highly dissociating.

Further:
 it is highly stable both under oxidizing and reducing conditions;
 it has a dipolar moment, which allows solvation of the ions; and
 it both has a high donor number and a high acceptor number, which ensures that it may behave both as a Lewis acid and a Lewis base.

However, these electrolytes are not very cost-effective, since they have a high cost and the use of certain organic solvents, for which the vapor pressure is high, poses a serious environmental problem, because they may be difficult to recycle and may evaporate in the surrounding atmosphere during their use.

As regards ionic liquids, ideally they do not have any measurable vapor pressure and have great thermal stability, which induces that the environmental and safety problems encountered with organic solvents (whether this be in terms of volatility, evaporation and risks of inflammability or explosion) are suppressed with them.

However, ionic liquids may have significant viscosity and therefore low ion conductivities, which causes high resistances at room temperature.

Thus, regardless of whether these are aqueous electrolytes, organic electrolytes or ionic liquids, drawbacks always emerge, inherent to the nature of these electrolytes and at the present time, no electrolytes exist combining both advantageous properties in terms of electrochemical stability, ion conductivity, temperature stability and viscosity.

DISCUSSION OF THE INVENTION

In order to fill the aforementioned gaps, the inventors developed a novel composition, which may be used as an electrolyte for lithium batteries, this composition comprising an ionic liquid consisting in the association of a pyrrolidinium cation and of a nitrate anion and comprising a solvent selected from lactone solvents, carbonate solvents, nitrile solvents and mixtures thereof.

The lactone solvent may be selected from γ-butyrolactone, β-butyrolactone, γ-valerolactone, δ-valerolactone and γ-caprolactone. Preferably, this solvent is γ-butyrolactone.

The carbonate solvent may be an alkylene carbonate such as propylene carbonate.

The nitrile solvent may a nitrile solvent comprising a nitrile function, such as acetonitrile and/or a nitrile solvent comprising two nitrile functions, such as adiponitrile and/or glutaronitrile.

In the compositions of the invention, the aforementioned ionic liquid may be present in amounts of at least 20% by mass based on the total mass of the composition and which may range up to 80% by mass.

As an example, a particularly efficient composition is a composition comprising:
an ionic liquid as defined above in an amount of 50% by mass based on the total mass of the composition; and
γ-butyrolactone in an amount of 50% by mass based on the total mass of the composition.

The compositions of the invention have high conductivity over a wide range of temperatures.

For example, for a composition comprising 50% by mass of ionic liquid and 50% by mass of γ-butyrolactone, the conductivity has, respectively at temperatures of −10° C., 25° C. and 80° C., values of 10 mS·cm$^{-1}$, 33 mS·cm$^{-1}$ and 68 mS·cm$^{-1}$.

The compositions of the invention are also highly stable over wide ranges of temperatures, such as a range of temperatures extending from −60° C. to 130° C.

The compositions of the invention thus group the strong points of the aforementioned organic solvents (strong conductivity and low viscosity) and those of ionic liquids (substantial thermal stability and low vapor pressure).

The compositions of the invention may be prepared by simple preparation methods within the reach of one skilled in the art.

Thus, the composition may be prepared according to the sequence of the following steps:
a step for weighing each of the constitutive ingredients of the composition (i.e., the ionic liquid and the lactone solvent);
a step for forming the composition by mixing said ingredients.

The ionic liquid may be prepared beforehand by a simple acid-base reaction according to the Brønsted mechanism between pyrrolidine and nitric acid.

Considering the aforementioned properties, the compositions of the invention form, because of the presence of an ionic liquid, an electrolytic mixture which makes them particularly suitable for being used as electrolytes, in particular, in an energy storage device, preferably of the supercapacitor type.

The invention therefore also relates to an energy storage device, for example of the supercapacitor type, as illustrated according to a particular embodiment in the single figure appended as an annex, comprising at least one cell 1 comprising a positive electrode 3 and a negative electrode 5 separated from each other by a separator 7 comprising as an electrolyte, an ionic liquid or a composition according to the invention.

The positive electrode and the negative electrode may be based on carbon, in particular on activated carbon, in which case the supercapacitors comprising this type of electrodes may be described as a symmetrical system.

The positive electrode and the negative electrode may also be based on metal oxide(s).

The compositions according to the invention form at each electrode-separator interface a double electrochemical layer.

The compositions according to the invention have high performances, even at very low temperatures (for example, for the aforementioned 50/50 composition, capacities of 112 F·g$^{-1}$ at 25° C. versus 120 F·g$^{-1}$ at −40° C.), there where conventional electrolytes would be faulty.

They are less corrosive than electrolytes based on sulfuric acid.

They also form an alternative to electrolytes using volatile organic solvents, which poses environmental problems (notably when the solvents are emitted into the atmosphere) and of safety (these solvents often have risks of inflammability).

The invention will now be described with reference to the examples provided below given as an illustration and not as a limitation.

SHORT DESCRIPTION OF THE DRAWINGS

DETAILED DISCUSSION OF PARTICULAR EMBODIMENTS

Example 1

This example illustrates the preparation of an ionic liquid of the pyrrolidinium nitrate type used as a base for preparing the compositions of the invention.

The preparation of this ionic liquid may be illustrated by the following reaction scheme:

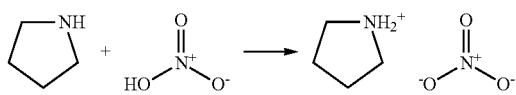

To do this, pyrrolidine (26.78 g; 0.37 mol) is introduced into a three-neck flask immersed in an ice bath and surmounted with a condenser. A thermometer is used for controlling the temperature. A 68% nitric acid solution (34.54 g; 0.37 mol) is added dropwise into the three-neck flask by means of a dropping funnel, this addition being carried out while maintaining vigorous stirring for 30 minutes. The acid-basic reaction which follows, is an exothermic reaction. The aforementioned ice bath allows the temperature of the reaction medium to be maintained at a value below 25° C. Once the addition is completed, stirring is maintained for 2 hours at room temperature, before adding 233 g of 1,2-dichloroethane which will form a heteroazeotrope with water. To remove the water, the mixture is distilled under normal pressure until the boiling temperature of the aforementioned heteroazeotrope is attained (i.e., 73° C.). The remaining 1,2-dichloroethane is finally evaporated under reduced pressure, in return for a remaining highly viscous transparent liquid. This liquid, corresponding to the aforementioned ionic liquid, is dried in vacuo, by using a liquid nitrogen trap, for two days.

The ionic liquid has a conductivity of 45 mS·cm$^{-1}$ at 25° C. and of 105 mS·cm$^{-1}$ at 80° C. It also has a viscosity close to 6 mPa·s at 25° C. and is equal to 1.5 mPa·s at 80° C., i.e., a viscosity close to that of water.

Example 2

This example relates to the study of the physicochemical properties of a composition according to the invention, more specifically of a composition comprising 50% by mass of the ionic liquid prepared in Example 1 and 50% by mass of γ-butyrolactone.

Figure 1:
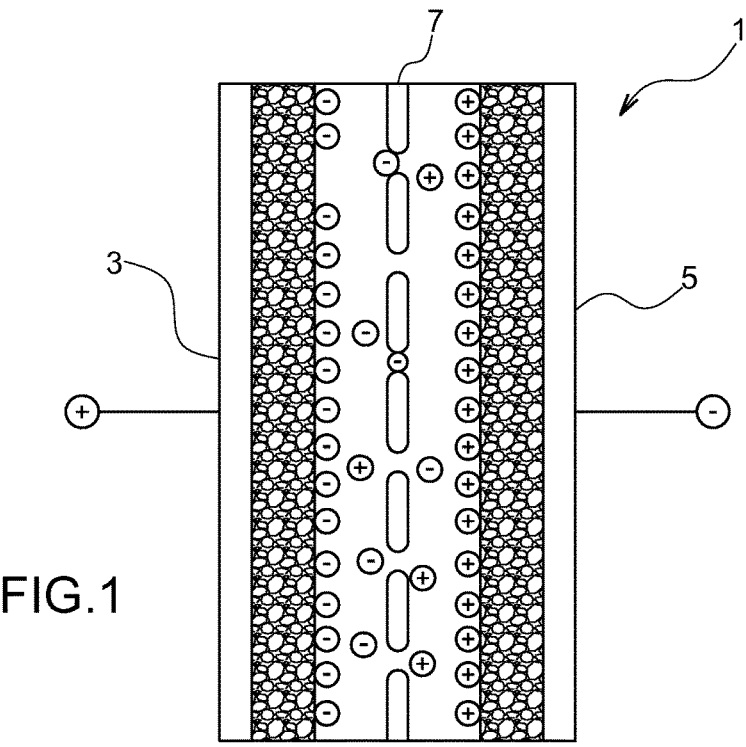
FIG. 1 represents a supercapacitor cell according to the invention.
Figure 2:
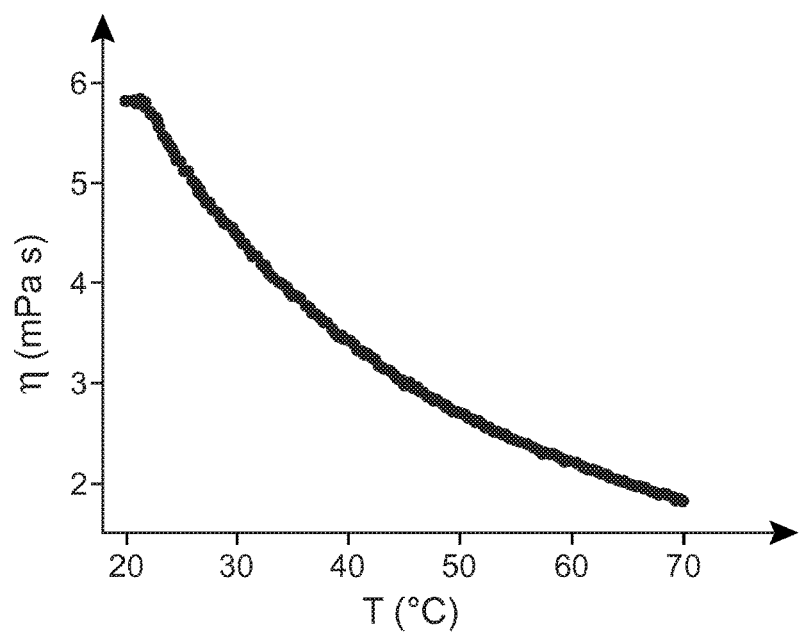
FIG. 2 is a graph illustrating the time-dependent change of the viscosity η (in mPa·s) versus temperature T (in ° C.) for the composition of Example 2.
Figure 3:
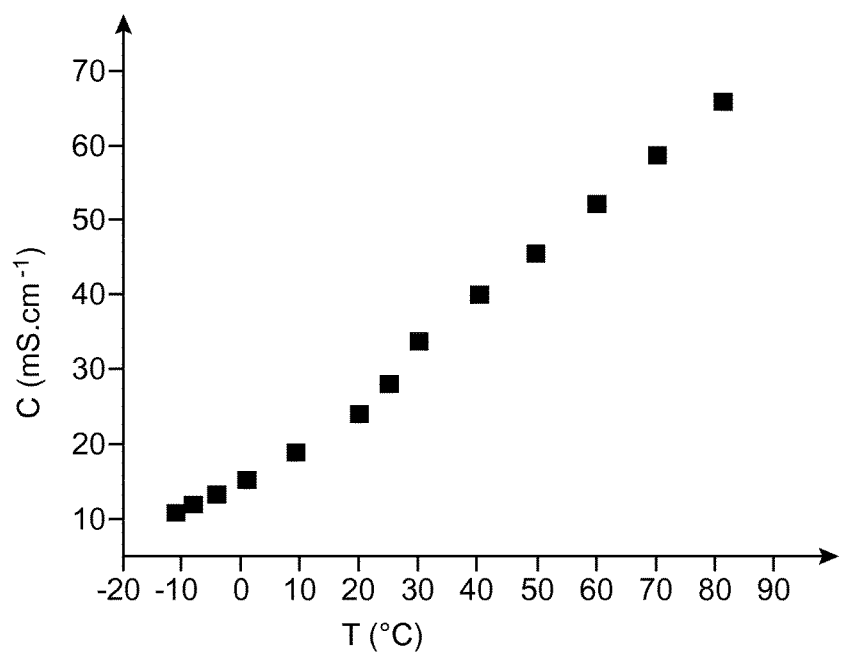
FIG. 3 is a graph illustrating the time-dependent change in the conductivity C (in mS·cm$^{-1}$) versus temperature T (in ° C.).

Thus, the time-dependent change versus temperature, of the viscosity and of the conductivity of said composition, was determined, the results being transferred in FIGS. 2 and 3 appended as an annex.

From FIG. 2, illustrating the time-dependent change of the viscosity η (in mPa·s) versus temperature T (in ° C.), it clearly emerges that the viscosity of the composition significantly decreases as soon as the temperature increases.

From FIG. 3, illustrating the time-dependent change of the conductivity C (in mS·cm$^{-1}$) versus temperature T (in ° C.), it emerges that the composition of the invention has conductivity values greater than 10 mS·cm$^{-1}$ over a range of temperatures from −10 to 80° C.

The thermal stability of the composition was also tested by differential scanning calorimetry. It emerges that no transition is observed in a range of temperatures from −60 to 100° C., which confirms the stability of this composition in this range of temperatures.

Figure 4:
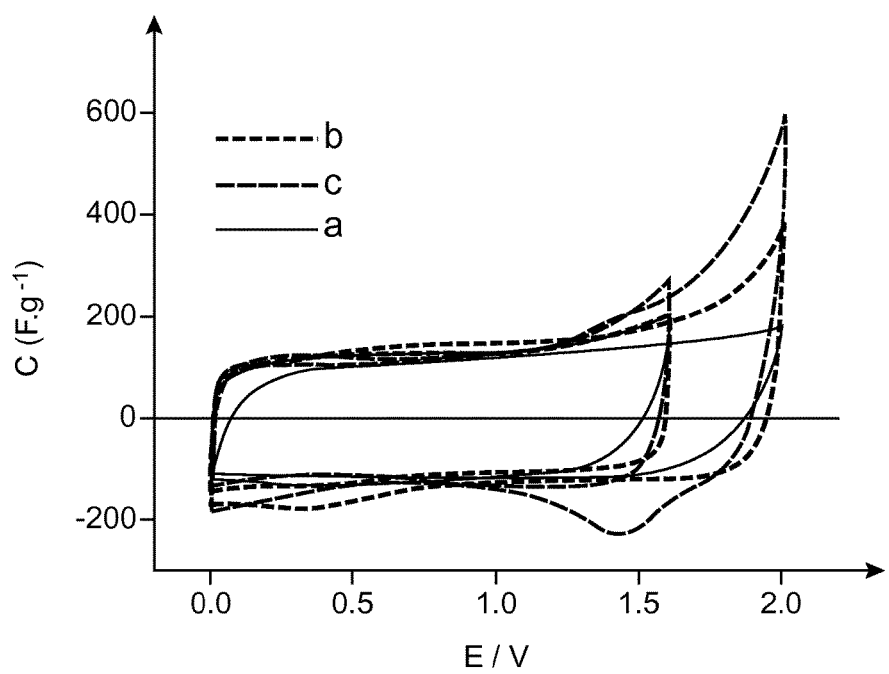
FIG. 4 is a cyclic voltammogram of the composition of Example 2 in a carbon/carbon symmetrical Swagelok system for different temperatures (−40, 20 and 50° C.) at 5 mV/s (curves a, b and c for −40, 20 and 50° C. respectively).
Figure 5:
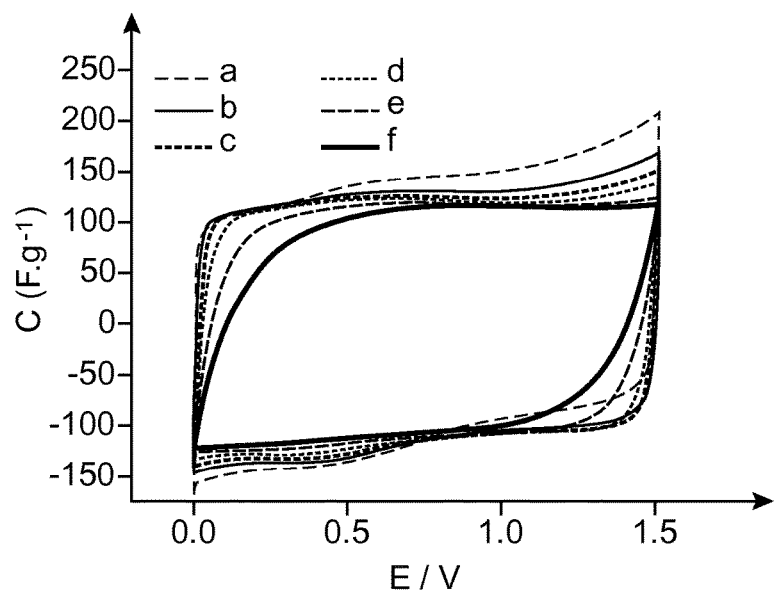
FIG. 5 is a cyclic voltammogram of the composition of Example 2 in a carbon/carbon symmetrical Swagelok system for different sweeping rates (2 mV/s, 5 mV/s, 10 mV/s, 20 mV/s, 50 mV/s and 100 mV/s) (curves a, b, c, d, e and f respectively).

The electrochemical behavior was also tested, on commercial activated carbon, by cyclic voltamperometry at different temperatures, as confirmed by FIG. 4 consisting in a cyclic voltamogram in a carbon/carbon symmetrical Swagelok system for different temperatures (−40, 20 and 50° C.) at 5 mV/s (curves a, b and c for −40, 20 and 50° C. respectively), and at different scanning rates as confirmed by FIG. 5 consisting in a cyclic voltamogram in a carbon/carbon symmetrical Swagelok system for different scanning rates (2 mV/s, 5 mV/s, 10 mV/s, 20 mV/s, 50 mV/s and 100 mV/s) at 20° C. (curves a, b, c, d, e and f for 2 mV/s, 5 mV/s, 10 mV/s, 20 mV/s, 50 mV/s and 100 mV/s respectively).

FIG. 4 notably shows that the composition of the invention is not perturbed by the variations of temperatures. At −40° C., this composition has the same electrochemical behaviour as at 20° C. FIGS. 4 and 5 thus contribute to disclosing the robust capacitive nature of the composition of the invention, regardless of the applied stresses.

Figure 6:
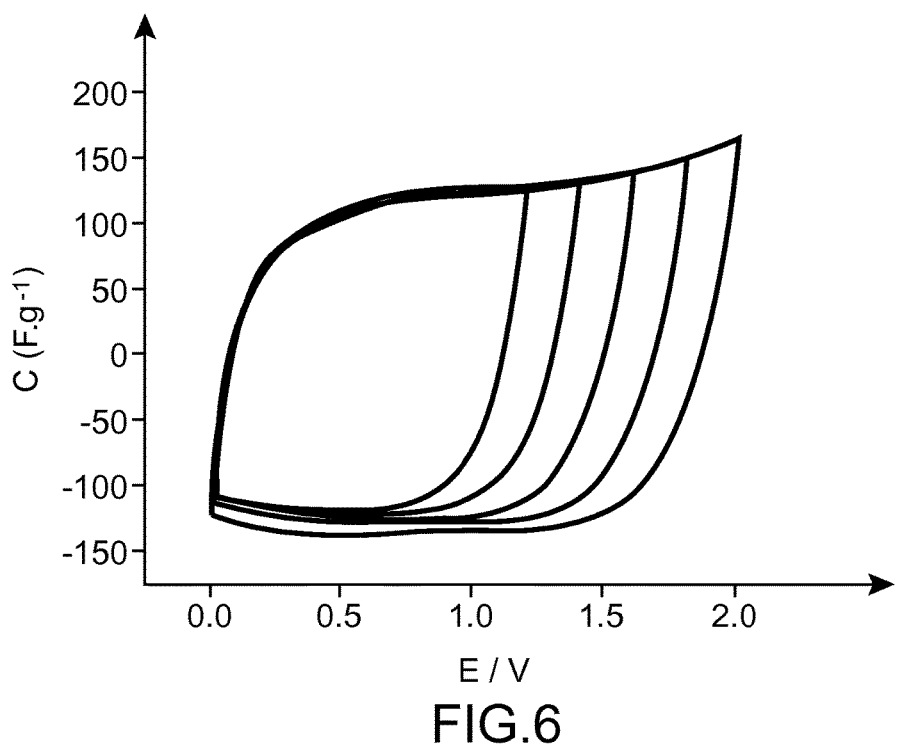
FIG. 6 is a cyclic voltammogram of the composition of Example 2 in a carbon/carbon symmetrical Swagelok system at 5 mV/s at −40° C. over a range of potentials from 0 to 2 V.

The study of the cyclability of the composition according to the invention was also carried out at extreme temperatures notably at −40° C., as confirmed by FIG. 6, consisting in a cyclic voltamogram in a carbon/carbon symmetrical Swagelok system at 5 mV/s at −40° C. over a range of potentials from 0 to 2 V. The maintaining of the cyclability over this range of operating voltages is remarkable at this temperature and is clearly superior to the results obtained with other aqueous and organic electrolytes.

The capacitances, determined in a galvanostatic mode for different operating voltages, are shown in the table below. It thus emerges that the variation of the operating temperatures does not perturb the composition according to the invention.

| Composition | T (° C.) | Operating voltage (E/V) | | | | | | |
| --- | --- | --- | --- | --- | --- | --- | --- | --- |
| | | 0.7 | 1.0 | 1.2 | 1.4 | 1.6 | 1.8 | 2 |
| Pyrrolidinium nitrate/γ-butyrolactone (50/50) | 50 | 105 | 106 | 107 | 112 | 121 | 135 | 153 |
| | 20 | 114 | 113 | 113 | 114 | 116 | 122 | 120 |
| | −10 | 99 | 107 | 110 | 113 | 117 | 120 | 125 |

The invention claimed is:

1. An electrolyte comprising an ionic liquid consisting in the combination of a pyrrolidinium cation of the formula

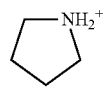

and of a nitrate anion and comprising a solvent selected from the group consisting of lactone solvents, carbonate solvents, nitrile solvents and mixtures thereof.

2. The electrolyte according to claim 1, wherein the solvent is a lactone solvent.

3. The electrolyte according to claim 1, wherein the lactone solvent is selected from the group consisting of γ-butyrolactone, β-butyrolactone, γ-valerolactone, δ-valerolactone, γ-caprolactone and mixtures thereof.

4. The electrolyte according to claim 1, wherein the solvent is γ-butyrolactone.

5. The electrolyte according to claim 1, wherein the ionic liquid is present in an amount of at least 20% by mass based on the total mass of the electrolyte up to 80% by mass.

6. The electrolyte according to claim 1, comprising:
an ionic liquid in an amount of 50% by mass based on the total mass of the electrolyte; and
γ-butyrolactone in an amount of 50% by mass based on the total mass of the electrolyte.

7. The electrolyte according to claim 1, wherein the solvent is a carbonate solvent.

8. The electrolyte according to claim 1, wherein the solvent is a nitrile solvent.

9. An energy storage device comprising at least one cell comprising a positive electrode and a negative electrode separated from each other by a separator comprising, as an electrolyte, a composition comprising an ionic liquid consisting in the combination of a pyrrolidinium cation of the formula

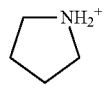

and of a nitrate anion and comprising a solvent selected from the group consisting of lactone solvents, carbonate solvents, nitrile solvents and mixtures thereof.

10. The energy storage device according to claim 9, which is a supercapacitor.

11. The energy storage device according to claim 9, wherein the positive electrode and the negative electrode are based on carbon.

12. The energy storage device according to claim 10, wherein the positive electrode and the negative electrode are based on carbon.

* * * * *

UNITED STATES PATENT AND TRADEMARK OFFICE
CERTIFICATE OF CORRECTION

PATENT NO. : 10,134,531 B2
APPLICATION NO. : 14/407563
DATED : November 20, 2018
INVENTOR(S) : Herve Galiano et al.

It is certified that error appears in the above-identified patent and that said Letters Patent is hereby corrected as shown below:

On the Title Page

Item (73) Assignees, "COMMISSARIAT A L'ENERGIE ATOMIQUE ER AUX ENERGIES ALTERNATIVES" should be --COMMISSARIAT A L'ENERGIE ATOMIQUE ET AUX ENERGIES ALTERNATIVES--.

Signed and Sealed this
Twelfth Day of February, 2019

Andrei Iancu
*Director of the United States Patent and Trademark Office*